Figure 1:
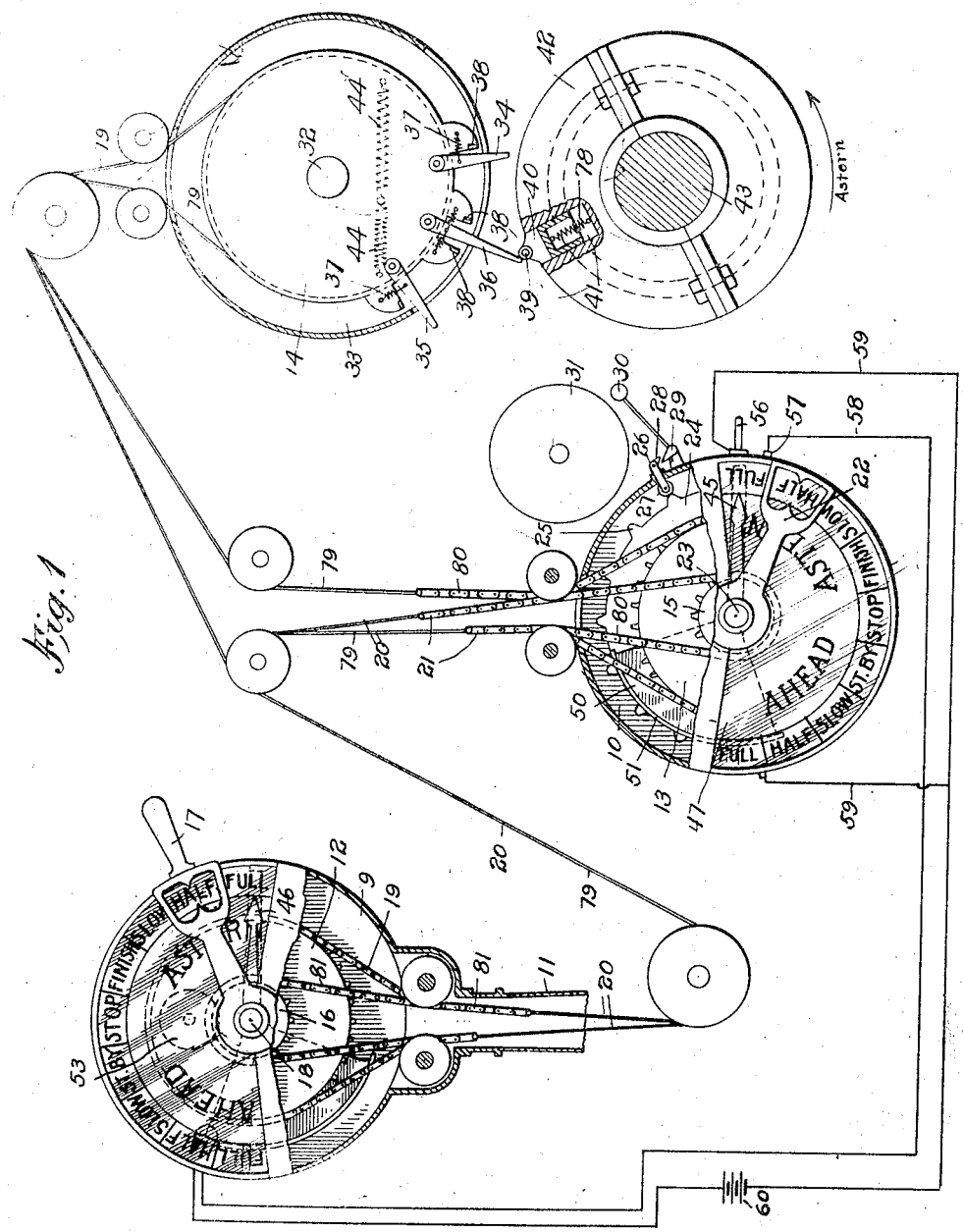

O. K. BOGSTRAND.
SHIP'S ENGINE ROOM SIGNAL.
APPLICATION FILED MAY 2, 1913.

1,115,278.

Patented Oct. 27, 1914.
2 SHEETS—SHEET 1.

WITNESSES

INVENTOR
OLE K. BOGSTRAND
BY
ATTORNEYS

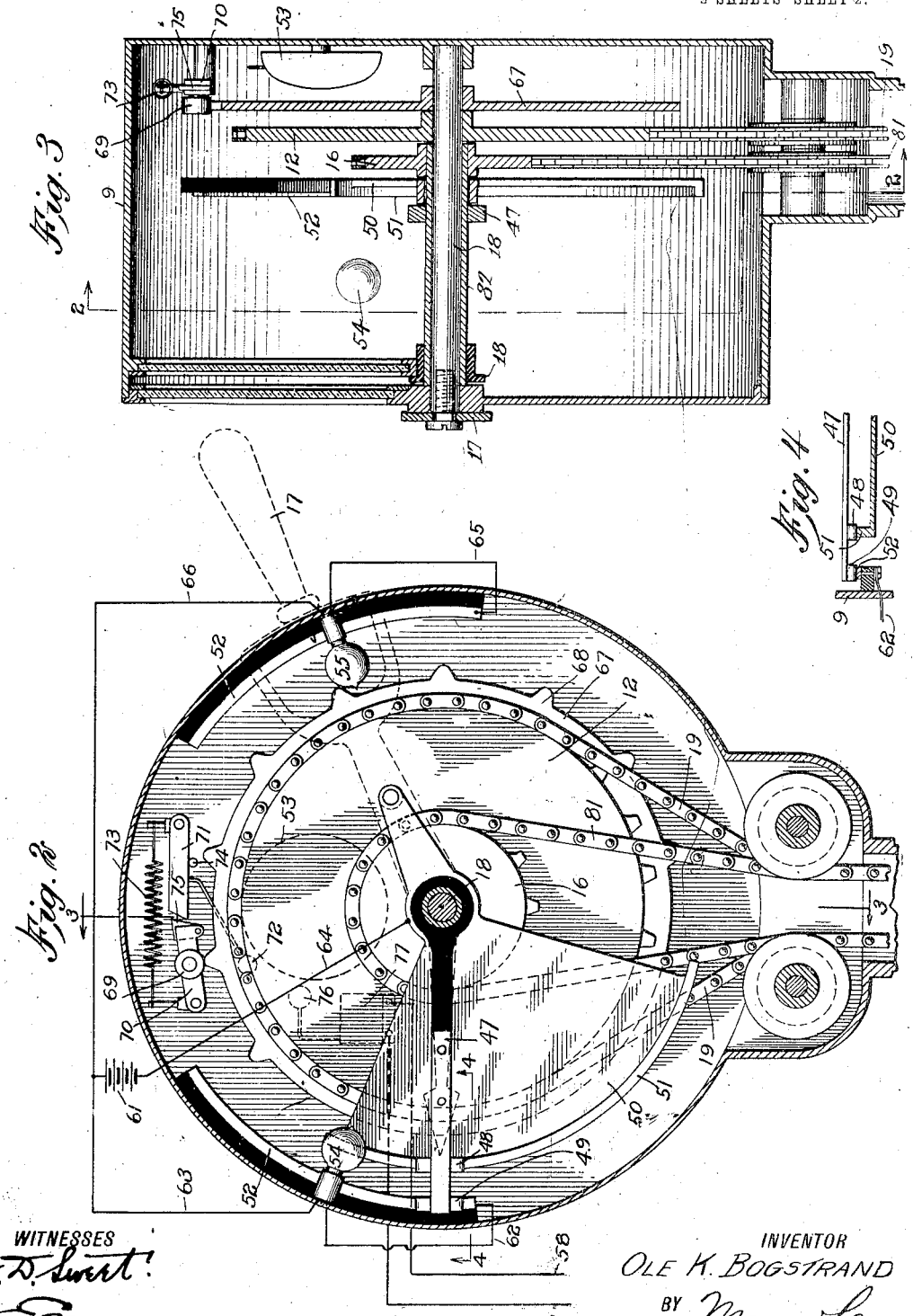

UNITED STATES PATENT OFFICE.

OLE K. BOGSTRAND, OF NEW YORK, N. Y.

SHIP'S ENGINE-ROOM SIGNAL.

1,115,278.  Specification of Letters Patent.  Patented Oct. 27, 1914.

Application filed May 2, 1913.  Serial No. 765,023.

*To all whom it may concern:*

Be it known that I, OLE K. BOGSTRAND, a citizen of the United States, and a resident of the city of New York, borough of Brooklyn, in the county of Kings and State of New York, have invented a new and Improved Ship's Engine-Room Signal, of which the following is a full, clear, and exact description.

Among the principal objects which the present invention has in view are: to provide a signal of the character indicated, embodying indicator instruments and a third member operatively connected with both of the first-mentioned instruments to disclose by the operation of the machinery if the directions transmitted through the signal instruments are put into effect; to provide means for disclosing by the use of said instruments the condition of the machinery of the vessel; and to simplify the construction of the signal mechanism and installation.

One embodiment of the present invention is shown in the accompanying drawings, in which—

Figure 1 is an assembled view showing in operative relation a bridge signal, an engine-room signal, a ship's propeller shaft, and a tell-tale device to show the operative direction of rotation of said shaft, together with transmission means for operatively connecting said parts; Fig. 2 is a detail view, on an enlarged scale, of the bridge signaling instrument, the section being taken on the line 2—2 in Fig. 3; Fig. 3 is a vertical cross section taken on the line 3—3 in Fig. 2; Fig. 4 is a cross section taken on the line 4—4 in Fig. 2.

As seen in the drawings, two signal boxes designated respectively by the numerals 9 and 10 are employed. The box 9 is mounted on a pedestal 11 on the navigating bridge of a vessel. The pedestal is preferably hollow to provide for the passage of lead-lines or belts for transmitting the rotation of a wheel 12 to a wheel 13, and for transmission from a wheel 14 to wheels 15 and 16. The box 9 is provided with a face dial, suitably subdivided and marked to indicate the orders of the navigator or officer in charge of a vessel.

The pointer handle 17 is pivoted on the box 9, concentric, in the manner usual to such signal instruments. The wheel 12 is rigidly connected to the shaft 18 forming the pivot for the handle 17. The wheel 12 is preferably provided with sprocket teeth to engage a sprocket chain section 19, the ends whereof are connected to cables 20, the opposite ends of which are connected with sprocket chain sections 21 that enfold and engage the sprocket teeth formed on the wheel 13 of the engineer's signal instrument, usually located in the engine-room of the vessel.

Rigidly connected to the wheel 13 is a pointer 22 mounted on a pivot shaft 23 in the box 10. The wheels 12 and 13 are of the same diameter, and the movement of the handle 17 and pointer 22 are therefore synchronized. The order dial on the box 9 is duplicated in the box 10, hence the order indicated on the dial of the box 9 is duplicated on the dial of the box 10 whenever the handle 17 on the first-mentioned box is shifted to express the desire and intent of the navigating officer.

To direct the attention of the engineer to the operation of the signal, a wheel 24, provided with a series of projections 25, is rigidly mounted on the shaft 23. The projections 25 ride beneath a small plunger 26 and a roller 27 carried thereby. The plunger 26 is provided with a yielding trip 28 to engage a spur 29. The spur 29 is rigidly connected to the stem of a hammer 30 arranged to strike the bell 31. Said bell 31 is conveniently disposed to the box 10 and to the hammer 30.

It will be observed that if the wheel 24 is rotated, the successive projections 25 passing thereunder operate upon the plunger 26 to vibrate the hammer 30, thereby sounding the bell 31 to arrest the attention of the engineer or assistant. The rotation of the wheel 24 and the movement of the pointer 22 are simultaneous with the rotation of the wheel 12 and the movement of the handle 17, respectively, the transmission between said wheels being effected by the chain sections 19, the cables 20, the chain sections 21 and the wheel 13.

As seen by the drawings, the dials on the boxes 9 and 10 are each provided with positions for the handle 17, and the pointer 22, respectively, indicating the normal or neutral point. The positions referred to are indicated in the drawings by the word "Stop." The dials referred to are also provided with indices to show the direction of operation intended by the navigator. The indices referred to are the words "Ahead" and "Astern," shown as printed on said dials. From the neutral point "Stop," the handle 7 is shifted to indicate directions as to the nning of the engine to propel the vessel forward or astern by moving said handle 17 to register with one of the indices on the portion of the dial corresponding with the "Ahead" or "Astern."

The purpose of the wheel 14 is to detect if the indicated signal is followed by the engineer. For this purpose, the wheel 14 is rotatably mounted on a shaft 32 within a box 33. The wheel 14 has extending from the periphery thereof three arms 34, 35 and 36. The arms 34 and 35 are disposed at equal distances and at opposite sides of the arm 36, and are each provided with a spring 37, by which said arms are drawn away from the arm 36. A series of pins 38 are provided to limit the throw of said arms, said pins being spaced apart to provide for a limited movement in both directions on the part of the arm 36, and an unlimited movement of the arms 34 and 35 when moved toward said arm 36. It is the purpose of this construction that the arms 34 and 35 shall yield when struck by the trip 39 when said trip is moving past either of said arms toward the arm 36.

The trip 39 is extended from a weighted plunger 40, which plunger is mounted in a recess 41 formed in a split disk 42. The disk 42 is rigidly mounted on the ship's propeller shaft 43.

The wheel 14 is normally held by springs 44 in a position where the arm 36 is in line with the centers of the propeller shaft 43 and the pivot shaft 32 of said wheel.

The wheel 14 is operatively connected with both the wheels 15 and 16 in the boxes 10 and 9, respectively. The wheel 15 is rotatively mounted on the shaft 23 in the box 10, and is provided with a pointer 45 rigidly connected therewith. The wheel 16 is similarly mounted being rigidly secured on a sleeve 82 which is rotatively mounted on the shaft 18. The shaft 18 is provided with a pointer 46 fixedly mounted thereon. The pointers 45 and 46 are each rigidly held in line with a contact bar 47. The bars 47 are each provided with wiper blocks 48 and 49.
Said blocks are furnished as contact members to electrically connect metallic sectors 50, and peripheral rails 51 thereof, with stationary contact rails 52 at opposite sides of each of the boxes 9 and 10.
The pointers 45 and 46, the wheel 14, and the intermediate transmission gear are so arranged that when the arm 36 is disposed at one side of the line bisecting the centers of the shafts 32 and 43, the pointers correspond with one of the indices "Ahead" or "Astern". In other words, the mechanism is set, so that as the propeller shaft 43 is rotated to move the vessel ahead, the pointers 45 and 46 in each of the signal boxes will coincide with the index "Ahead" on the dial of said boxes. This will continue irrespective of the movement of the handle 17, pointer 22 or parts operatively connected therewith, until the propeller shaft is stopped or reversed. When the propeller shaft is stopped, the springs 44 will shift the wheel 14 until the arm 36 assumes the vertical position above indicated as being that intersecting the centers of the shafts 32 and 43.

The sectors 50 are rigidly mounted on sleeves 82 on the shafts 18 and 23 to move with the wheels 15 and 16. When the handle 17 and pointer 22 are moved to either of the areas indicated by the "Ahead" or "Astern", the sector 50 connected with each is so moved as to place the rail 51 carried thereby opposite one of the rails 52 in the boxes 9 and 10. If the propeller shaft 43 has been moving to propel the vessel astern, and the handle 17 is moved into the area covered by the index "Ahead", the immediate effect would be to place the rails 51 on each of the sectors 50 connected with the handle 17 and with the pointer 22, under the block 48 on each of the connecting bars 47. The above-mentioned disposition of the sectors completes two distinct electric circuits, the one completed by the sectors and rails in the box 10, operating the sounding bell 53 which is mounted on the box 9, or in any other convenient position sufficiently near the pedestal 11 to be heard by the navigating officer.
The circuit completed within the box 9 operates to illuminate one of the lamps 54 or 55, as the case may be. The lamps 54 and 55 are relatively varied by color, one showing preferably red, while the other is preferably white, thereby conventionally indicating the stern light and the forward light. Hence, if the signal indicated by the navigating officer is not obeyed, the lamp 54 or 55 corresponding to the direction of rotation of the shaft 43 continues to shine, and the bell 53 continues to ring. If the time of operation be during daylight, when the circuit embodying the lamps 54 and 55 is discontinued, the failure of the engineer to respond to the indicated signal, is detected by the ringing of the bell 53.

The battery or electric source 60 shown in Fig. 1 of the drawings is preferably distinct from the battery or electric source 61 shown in Fig. 2 of the drawings. The circuit including the latter battery or dynamo, as the case may be, is uninterrupted when the contact bar 47 closes the circuit through the lamps 54, said circuit being completed by means of wires 62, 63 and 64. If the lamp 55 is illuminated, the circuit includes the wires 65, 66 and 64.

To indicate to the navigating officer the fact that the wheel 12 is rotating, the shaft 18 to which said wheel is secured is provided with a disk 67 the knobs 68 of which pass below the roller 69 on a rocking lever 70. The lever 70 is provided to operate a second lever 71, which is provided with a hammer 72 disposed to strike the bell 53. The levers 70 and 71 are operatively connected by means of a pull spring 73 in the manner substantially as shown in Fig. 2 of the drawings. The spring 73 normally holds the lever 71 against a stop pin 74. The lever 71 is lifted by the lever 70, the latter having a yielding trip 75 constructed to avoid the lever 71 when passing downward in front thereof, and to fall into engaging position when once below the lever 71.

When the bell 53 is operated by closing the circuit embodying the wires 58, 59 and the battery 60, a hammer 76 is employed, the usual magnet 77 being used to vibrate said hammer.

The plunger 40' is weighted, as above stated, and is held normally in retracted position within the recess 41 by means of a spring 78. The spring 78 is set to exert a definite and known pull. As the shaft 43 is revolved fast or slow, the centrifugal force exerted upon the plunger 40 overcomes to a greater or less degree the pull on the spring 78. As the plunger 40 is extended or retracted from or into the recess 41, the movement of the wheel 14 is augmented by the operation of the trip 39 on said plunger, the arc of movement of the trip, while in engagement with the arm 36 being thereby increased or diminished. This augmentation of the rotation of the wheel 14 results in a corresponding movement of the pointers 45 and 46. The rapidity of impact of the trip 39 upon said lever maintains more or less constant the thrown position of said pointers, and thereby indicates the speed of the shaft 43 on the dial of the boxes 9 and 10.

The wheel 14 is operatively connected with both the wheels 15 and 16 by means of a power transmission belt formed by the cable 79 and the chain sections 80 and 81, which sections are adapted to engage the sprocket teeth provided on said wheels 15 and 16.

Claims:

1. A signal apparatus having a box body with order indications thereon; a handle rotatively mounted in said box body; a wheel rotatively mounted adjacent a shaft to be controlled in conformity with signals indicated on said body; a trip mounted on said shaft; yielding projections mounted on said wheel, extending into the path of said trip; a rotary member mounted in said box body concentric with said handle; means operatively connecting said wheel and said rotary member, to operate said rotary member in accordance with the movement of said wheel; and an electric signal system incorporating said handle and said rotary member to show disagreement between the signal set and the movement of said shaft.

2. A signal apparatus having a box body provided with order indications thereon; a handle rotatively mounted in said box body; a wheel rotatively mounted adjacent a shaft to be controlled in conformity with signals indicated on said body; a trip mounted on said shaft; yielding projections mounted on said wheel, extending into the path of said trip; a rotary member mounted in said body concentric with said handle; means operatively connecting said wheel and said rotary member to operate said rotary member in accordance with the movement of said wheel; an electric signal system incorporating said handle and said rotary member to show disagreement between the signal set and the movement of said shaft; and means for moving said trip to and from said shaft conformable with the speed of rotation of said shaft.

3. A signal as characterized, comprising a rotary shaft; a plurality of oppositely-disposed stationary electric-circuit terminal members, said members being concentric with said shaft; a manually-operative handle pivotally mounted on said shaft; a movable electric-circuit terminal member mounted on said handle, said terminal member being concentric with said shaft and movable parallel with and in spaced relation to said stationary circuit terminal members; a circuit-closure member fixedly mounted upon said shaft for engaging said movable terminal member and one of said stationary terminal members when said terminal members are in juxtaposed relation; and an auxiliary signal embodying all of said terminal members.

4. A signal as characterized, comprising a rotary shaft; a plurality of oppositely-disposed stationary electric-circuit terminal members, said members being concentric with said shaft; a manually-operative handle pivotally mounted on said shaft; a movable electric-circuit terminal member mounted on said handle, said terminal member being concentric with said shaft and movable parallel with and in spaced relation to said stationary circuit terminal members; a circuit-closure member fixedly mounted upon said shaft for engaging said movable terminal member and one of said stationary terminal members when said terminal members are in juxtaposed relation; and an auxiliary electrical signal system, embodying a sounding bell operable when said closure member engages said movable terminal member and one or other of said stationary terminal members.

5. A signal as characterized, comprising a rotary shaft; a plurality of oppositely-disposed stationary electric-circuit terminal members, said members being concentric with said shaft; a manually-operative handle pivotally mounted on said shaft; a movable electric-circuit terminal member mounted on said handle, said terminal member being concentric with said shaft and movable parallel with and in spaced relation to said stationary circuit terminal members; a circuit-closure member fixedly mounted upon said shaft for engaging said movable terminal member and one of said stationary terminal members when said terminal members are in juxtaposed relation; a plurality of electric circuits, each circuit incorporating said movable terminal member and one of said stationary terminal members; and a plurality of electric lamps, one mounted on each of said circuits for illumination when said closure member engages one or other of said stationary terminal members and said movable terminal member, said lamps being selectively distinguished for indicating purposes.

In testimony whereof I have signed my name to this specification in the presence of two subscribing witnesses.

OLE K. BOGSTRAND.

Witnesses:
E. F. MURDOCK,
PHILIP D. ROLLHAUS.